United States Patent
Voorhees et al.

(10) Patent No.: US 9,499,284 B1
(45) Date of Patent: Nov. 22, 2016

(54) DUAL USE IMAGING AND OPTICAL COMMUNICATIONS SYSTEM FOR MICROSATELLITES

(71) Applicant: Planetary Resources Development Corp., Redmond, WA (US)

(72) Inventors: Chris Voorhees, Bellevue, WA (US); Chris Lewicki, Bellevue, WA (US)

(73) Assignee: Planetary Resources Development Corp., Redmond, WA (US)

( * ) Notice: Subject to any disclaimer, the term of this patent is extended or adjusted under 35 U.S.C. 154(b) by 652 days.

(21) Appl. No.: 14/218,502

(22) Filed: Mar. 18, 2014

Related U.S. Application Data

(60) Provisional application No. 61/799,993, filed on Mar. 15, 2013.

(51) Int. Cl.
*H04B 10/00* (2013.01)
*B64G 1/28* (2006.01)
*B64G 1/66* (2006.01)
*H04J 14/00* (2006.01)

(52) U.S. Cl.
CPC .. *B64G 1/28* (2013.01); *B64G 1/66* (2013.01)

(58) Field of Classification Search
CPC ................ H04B 10/11; H04B 10/112; H04B 10/1121; H04B 10/1123; H04B 10/1125; H04B 10/1127
USPC ........................................................ 398/118
See application file for complete search history.

(56) References Cited

U.S. PATENT DOCUMENTS

| | | | | | |
|---|---|---|---|---|---|
| 5,119,225 A | * | 6/1992 | Grant | ................... | H04B 10/118 244/158.4 |
| 2008/0118247 A1 | * | 5/2008 | Drago | .................. | H04B 10/118 398/122 |
| 2009/0324236 A1 | * | 12/2009 | Wu | ...................... | H04B 10/118 398/122 |

OTHER PUBLICATIONS

Smith et al., "ExoplanetSat: Detecting transiting exoplanets using a low-cost CubeSat platform," Proc. Of SPIE, vol. 7731, Aug. 2010, pp. 773127-1-773127-14.
Pong, et al., "Achieving high-precision pointing on ExoplanetSat: Initial feasibility analysis," Proc. SPIE, vol. 7731, Aug. 2010, pp. 77311V-1-77311V-16.
Pong, et al., "One-Arcsecond Line-of-Sight Pointing Control on ExoplanetSat, A Three-Unit Cubesat," Proceedings of the American Astronautical Society Guidance and Control Conferences, 11-035, Jan. 2011, pp. 147-166.

* cited by examiner

*Primary Examiner* — Daniel Dobson
(74) *Attorney, Agent, or Firm* — Venald LLP; Steven J. Schwarz

(57) ABSTRACT

A multi-functional optical subsystem for a spacecraft includes a laser diode module having output optics; an imaging and communication detector assembly; and a forward metering structure. The multi-functional optical subsystem is adapted for laser-based optical communication and attitude determination. According to embodiments, the subsystem fits within a small satellite having less than about 20 kg mass and less than about 10,000 cm3 total volume.

14 Claims, 1 Drawing Sheet

DUAL USE IMAGING AND OPTICAL COMMUNICATIONS SYSTEM FOR MICROSATELLITES

CROSS-REFERENCE TO RELATED APPLICATIONS

This application claims priority under 35 U.S.C. Section 119 to U.S. Provisional Application No. 61/799,993, filed on Mar. 15, 2013, the entire content of which is incorporated herein by reference. This application also relates to U.S. application Ser. No. 13/869,643, filed on Apr. 24, 2013, the entire content of which is incorporated herein by reference.

BACKGROUND

Interest in maturing the capabilities of small satellite platforms (e.g., mass less than ~20 kg and volume less than ~10,000 $cm^3$) has grown dramatically in recent years. Initial efforts to develop small spacecraft were primarily academic efforts to reduce the resources required for access to space. Now, small spacecraft, including the CubeSat standard, are attracting significant interest for use in missions that would have previously been reserved for larger spacecraft. This increased interest is driving the need to expand the capabilities of subsystems on small satellites, such as communications systems, while keeping within the significant constraints imposed by the limited size and mass of the platform.

Large-scale implementation of space-based laser communications systems has been actively discussed for decades. To date, however, specific implementations of this technology have been limited to a handful of discrete demonstrations using large spacecraft platforms. The slow progress toward main-stream adoption of space-based laser communications, even on large spacecraft, has been constrained by available platforms willing to experiment with the technology. While limited in complexity and number, there has been a steady string of optical communication demonstrations using orbiting assets. For example, in 1992, the GOPEX experiment successfully transmitted laser pulses from Earth which were detected by a receiver aboard the Galileo probe en-route to Jupiter while at a range of approximately 6 million km. In 2005, the MESSENGER spacecraft, while en-route to Mercury, participated in the first two-way inter-planetary communications link through use of the on-board laser-altimeter and NASA's Goddard Geophysical Astronomical Observatory at a distance of 24 million km. The European Space Agency (ESA) also conducted an experiment between the Artemis spacecraft (a GEO telecommunications satellite) and the French SPOT-4 spacecraft in LEO using two optical communications SILEX (Semiconductor Inter-satellite Link Experiment) terminals, one on each spacecraft. In 2001, this inter-satellite system was first successfully demonstrated at a range of 36,500 km and a data rate up to 50 Mb/s. This same Artemis SILEX terminal was subsequently used in 2006 to demonstrate a similar data transmission rate to a terminal on an aircraft in flight. In 2005, The Japan Aerospace Exploration Agency (JAXA) launched the OICETS (Optical Inter-Orbit Communications Engineering Test Satellite), also known as Kirari. This platform demonstrated an inter-satellite link to ESA's Artemis spacecraft shortly after launch, and was subsequently used in 2006 and beyond to demonstrate optical communications capability to several ground stations. More recently, a bi-directional inter-satellite link was demonstrated in 2008 between the TESAT-built German TerraSAR-X satellite and a corresponding TESAT laser communications terminal aboard the US NFIRE spacecraft at a distance of 5,000 km and a rate of 5.5 Gbps.

Previous laser communications experiments have universally been demonstrated with a large spacecraft platform as host. To date, there has been little work in the area of miniaturizing this technology into a robust and reliable system for micro-satellites or nano-satellites.

SUMMARY

According to an embodiment, the present invention provides a multi-functional optical subsystem for a spacecraft, comprising: a laser diode module including output optics; an imaging and communication detector assembly; and forward metering structure; wherein the multi-functional optical subsystem is adapted for laser-based optical communication and attitude determination.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Various embodiments of the invention are discussed in detail below. While specific embodiments are discussed, it should be understood that this is done for illustration purposes only. A person skilled in the relevant art will recognize that other components and configurations can be used without departing from the spirit and scope of the invention.

According to embodiments, the present invention can provide a multi-functional optical subsystem for small spacecraft (e.g., microsatellites). According to embodiments, the optical subsystem can be configured and arranged for attitude determination, stability control, scientific observation, and/or and high-precision optical communication. According to embodiments, the system and methodology may enable the primary optic of a small spacecraft to be used for multiple purposes, some simultaneously, to enhance the capability of the overall system to generate and communicate useful scientific data. For example, a single optical subsystem may be capable of providing attitude determination, stability control, and making scientific observations, while also supporting optical communications, thus providing significant additional communication capability to the small spacecraft. Embodiments of the invention provide small satellite communications capability at bandwidths and distances where RF is not practical.

Figure 1:
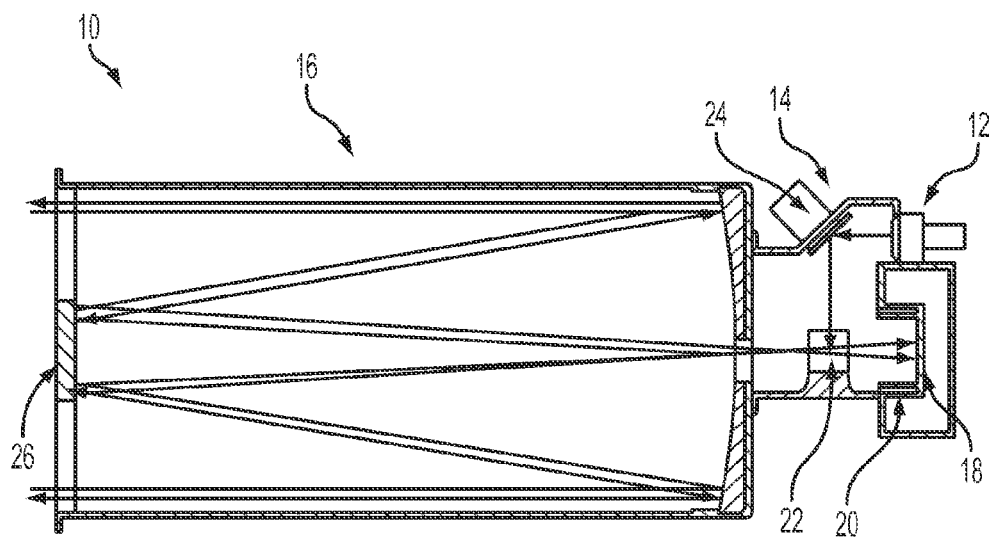
FIG. 1 depicts a schematic illustration of a multi-functional optical subsystem according to the present invention.

FIG. 1 depicts a schematic representation of a multi-function optical subsystem 10 according to the present invention. As shown, the subsystem 10 can include an aft region including an IR laser diode module and output optics 12. According to an embodiment, the IR laser diode module and output optics 12 can be integrated into spacecraft's primary optical subsystem. The subsystem 10 can also include an aft metering structure 14, imaging and communication detector assembly 18, piezo-driven X-Y positioning table 20, dichroic module 22 for visible light pass-through, and a piezo driven tip/tilt steerable mirror 24. The subsystem 10 can also include a forward region including a forward metering structure 16 and a secondary mirror 26. According to embodiments, all or parts of the forward metering structure can be composite.

Figure 2:
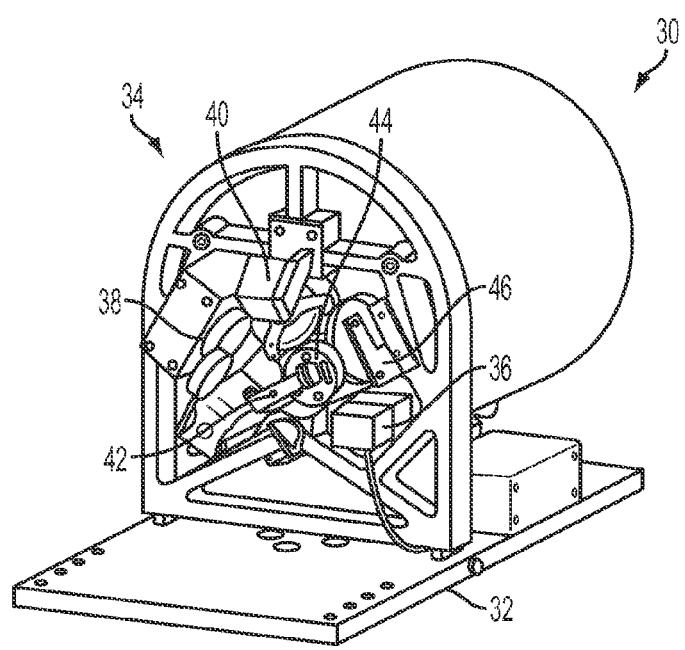
FIG. 2 depicts a perspective view of an embodiment of the multi-functional optical subsystem according to the present invention.

FIG. 2 depicts a perspective view of an alternative embodiment of the multi-functional optical subsystem, shown as reference number 30. The subsystem 30 can include an optical bench 32 for securing the subsystem 30 in a microsatellite, small spacecraft, or other spacecraft. Reference 34 in FIG. 2 generally depicts the aft region of the subsystem 30 and associated components described above in connection with FIG. 1. The embodiment's laser diode and output optics 36 and imaging/communications detector assembly 38 are secured to the optical bench and service the optical subsystem through a dichroic module 40 and piezo-driven tip/tilt steerable mirror 42. The indexing actuator 44 allows light from the optical subsystem to be provided to other instruments, a notional positional example of which is shown as 46.

According to embodiments, a multi-functional optical subsystem according to the present invention can provide several advancements over the prior art. For example, according to embodiments, the system is a multi-functional system, providing attitude determination, stability control, scientific observation, and laser communication capabilities in one package. Additionally or alternatively, embodiments of the system may be capable of high-precision optical stability, e.g., down to the sub-arcsecond level, enabling optical communication at high data rates or over long (interplanetary) distances. Additionally or alternatively, embodiments of the system can function within the constraints of a small satellite of less than about 20 kg mass and about 10,000 cm$^3$ total volume.

According to embodiments, a multi-functional optical subsystem may be used in a variety of space applications. For example, it may be used in high bandwidth applications for small satellites in Low Earth Orbit, low bandwidth applications for small spacecraft in deep-space, scientific and commercial observations requiring high optical stability, and/or terrestrial high-bandwidth optical data communication.

A Small Satellite System

Microspacecraft capable of deep-space exploration may be extremely limited in mass, volume, and power in order to take advantage of lower-cost rideshare launch opportunities. As a result, they may have limited capabilities when compared with larger spacecraft and have relatively small budgets to fund their design, launch, and operation. A multi-functional optical subsystem according to the present invention can expand what is possible with small spacecraft systems.

Multi-Functional System

The constraints of small spacecraft, some of which are described above, can leave few resources available to a scientific payload after standard bus operating needs have been satisfied. Accordingly, it can be beneficial when one subsystem can perform many functions that are typically distributed across several independent hardware elements. Embodiments of a multi-functional optical subsystem of the present invention can enable the primary optic of a small spacecraft to be used for multiple purposes, some simultaneously, to enhance the capability of the overall system to generate and communicate useful scientific data. For example, according to embodiments, a single optical subsystem can provide attitude determination, stability control, and/or make scientific observations. Additionally or alternatively, the subsystem can also support optical communications, providing significant additional communication capability to the small spacecraft.

A High-Precision System

Many valuable communication and scientific observation capabilities are enabled or significantly enhanced by the ability to provide high-precision pointing stability to the payload or communications system. For example, small spacecraft face difficulty when attempting to provide this capability. The inherent instability of low mass spacecraft and the relatively poor performance of low-cost Attitude Determination & Control Systems (ADCS) can cause a condition called "reaction wheel-induced jitter."

According to embodiments, the multi-functional optical subsystem of the present invention can include a closed-loop piezo-electric stabilization system that can mitigate the effects of reaction wheel-induced jitter. For example, the piezo-electric stabilization system can include the piezo-driven tip/tilt steerable mirror 24 and piezo-driven X-Y positioning table 20 of FIG. 1. Additionally or alternatively, MEMS gyro and/or accelerometer inputs can be used to further improve the system's pointing and stabilization performance. The closed-loop piezo-electric stabilization system can be physically integrated into the optical subsystem, and utilize the primary optic to provide inputs to a "star tracker" measurement system.

According to embodiments, high-precision optical stability systems may provide an enabler of optical communications on deep-space exploration microspacecraft. Optical communication capabilities are often necessary for high-bandwidth or long distance communications with small spacecraft, and require sub-arcsecond optical pointing stability to operate effectively. According to embodiments, the multi-functional optical subsystem of the present invention can provide a target optical pointing stability of ~0.1 arcseconds.

Embodiments of the present invention can provide small spacecraft capability gains in the following areas: attitude control; mass; power; ground communication; crosslink communication; and/or deep-space communication.

Attitude Control

According to embodiments, there are two main elements of an attitude control system: 1) attitude determination; and 2) pointing correction. Pointing stability becomes the driving requirement when attempting low-power optical communication at high data rates or over long distances. To achieve optical communications capability with a modest optic (e.g., 20 cm) at interplanetary distances up to 1 AU, optical pointing control and stability of ~0.1 arcseconds is typically required. To reach this level of pointing stability, the optical system must compensate for the effects of spacecraft attitude stability and jitter, which can be two or more orders of magnitude larger than the pointing accuracy requirement. According to embodiments, the multi-function optical subsystem can improve overall pointing stability for a small satellite by nearly 2 orders of magnitude to the sub-arcsecond level. The resultant increase in attitude control can enable enhanced measurement and communication capabilities from small spacecraft. It can also reduce the time required to make and communicate scientific measurements, thereby reducing mission costs and/or increasing mission capabilities.

Mass

By incorporating the functionality of multiple systems into one subsystem, the multi-function optical subsystem of the present invention allows the limited mass available on a small spacecraft to be used more effectively. As the optical train represents a substantial spacecraft resource investment in volume and mass, the innovation maximizes the utility of the optical system. According to embodiments, the primary optical train may be used for attitude determination, pointing control, and optical communications, while maintaining the ability to utilize the primary optic for scientific observations. By reducing the need for multiple systems, the mass conserved can be used for greater scientific benefit.

Power

Improvements in power utilization can be some of the most useful developments for increasing the capability of small spacecraft. Power saved from one subsystem can be provided to improve the performance of nearly every other system: communications, thermal management, payload, etc. According to an embodiment, the multifunction optical subsystem may provide the capability to incorporate a low-power, high-performance communication system on a small spacecraft. For example, a typical small spacecraft RF communications system might require 40-60 W of power, while embodiments of the multi-function optical subsystem require about 10-15 W, a 75% reduction in power consumption. Selection of a lower-power communication system directly and indirectly provides more power for other spacecraft subsystems: less power is drawn by the transmitter and less waste heat is generated, reducing the power needs of a thermal control system.

Ground Communication

The rapid development of more capable payloads for small satellites in LEO is driving demand for increased communications data rates. However, performance is limited by the bandwidth available from state-of-the art small satellite RF communications systems—typically 1-100 kbps. This bandwidth can be a constraint for many data-intensive applications being developed for small satellites. Providing high bandwidth optical communication on a small spacecraft can substantially increase the overall capability of the system to collect and communicate science data. Embodiments of the multi-function optical subassembly can improve the communication capability of current LEO small satellite systems by 4 orders of magnitude, providing data rates greater than 1 Gbps.

Deep-Space Communication

Current small satellite communication systems provide virtually no capability for communication beyond LEO, making meaningful deep-space exploration by small spacecraft impossible. In accordance with embodiments of the invention, current LEO data rates (1-100 kbps) may be realized at interplanetary distances. At 2 AU, the multi-function optical subsystem may provide baseline performance of 200 bps, surpassing the 160 bps data rate sufficient to operate the Galileo mission at Jupiter. At a lesser distance of 0.01 AU or 1.5 million km, the multi-function optical subsystem could provide up to 1 Mbps from the Earth-Sun L1/L2 Lagrange points, an ideal location for Solar or Astronomy observations. These deep-space optical communication capabilities for small spacecraft may enable a greater number of missions, making deep-space accessible to lower-cost investigations and to commercial ventures.

Embodiments of the multi-function optical subsystem can provide a precision pointing subsystem and optical train element that enable bi-directional (transmit and receive) optical communication, fine-pointing correction, and may maintain the capability to use the prime-optic for science observations and fine-attitude knowledge. The system may be a very low power, low mass, small volume precision pointing subsystem, utilizing a minimum amount of system resources.

Applications for the multi-function optical subsystem can include, without limitation: high bandwidth applications for small satellites in LEO; satellite crosslink communications; HD video from orbit; low cost Earth observation constellations; real-time disaster monitoring; data-rich scientific payloads; low bandwidth applications for small spacecraft in deep-space; NEO detection and exploration; solar observation; astronomy observation; scientific and commercial observations requiring high optical stability; low brightness astronomical objects; high resolution Earth observation from LEO; terrestrial high-bandwidth data communication; UAVs; robots; and vehicles.

From the foregoing description, one skilled in the art can readily ascertain the essential characteristics of the invention, and without departing from the spirit and scope thereof, can make changes and modifications of the invention to adapt it to various conditions and to utilize the present invention to its fullest extent. The specific embodiments described here are to be construed as merely illustrative, and not limiting of the scope of the invention in any way whatsoever. Moreover, features described in connection with one embodiment of the invention may be used in conjunction with other embodiments, even if not explicitly stated above. The entire disclosure of all applications, patents, and publications cited above are hereby incorporated by reference in their entirety.

The invention claimed is:

1. A multi-functional optical subsystem for a spacecraft, comprising:
   a laser diode module including output optics;
   an imaging and communication detector assembly; and
   a forward metering structure;
   wherein the multi-functional optical subsystem is adapted for laser-based optical communication and attitude determination.

2. The multi-functional optical subsystem of claim 1, wherein the multi-functional optical subsystem is adapted for stability control and image collection.

3. The multi-functional optical subsystem of claim 2, further comprising a closed-loop piezo-electric stabilization system.

4. The multi-functional optical subsystem of claim 2, wherein the multi-functional optical subsystem is adapted for stability control to the sub-arcsecond level.

5. The multi-functional optical subsystem of claim 2, further comprising a MEMS gyro and/or accelerometer control loop.

6. The multi-function optical subsystem of claim 1, further comprising an aft metering structure.

7. The multi-function optical subsystem of claim 1, further comprising a piezo-driven XZ positioning table.

8. The multi-function optical subsystem of claim 1, further comprising:
   a piezo-driven steerable mirror in optical communication with the laser diode module; and
   a dichroic module in optical communication with the piezo-driven steerable mirror.

9. The multi-function optical subsystem of claim 1, further comprising:
   a secondary mirror located on the forward metering structure.

10. The multi-functional optical subsystem of claim 1, further comprising a piezo-driven X-Y piezo table.

11. The multi-functional optical subsystem of claim 1, wherein the multi-functional optical subsystem comprises a self-contained subsystem.

12. The multi-function optical subsystem of claim 11, wherein the subsystem fits within a small satellite having less than about 20 kg mass and less than about 10,000 cm3 total volume.

13. The multi-functional optical subsystem of claim 1, wherein the laser diode module can be integrated into spacecraft's primary optical subsystem.

14. The multi-function optical subsystem of claim 1, wherein the metering system comprises a composite metering system.

* * * * *